(12) United States Patent
Hefty et al.

(10) Patent No.: US 6,735,174 B1
(45) Date of Patent: May 11, 2004

(54) METHOD AND SYSTEMS FOR FLOW CONTROL OF TRANSMISSIONS OVER CHANNEL-BASED SWITCHED FABRIC CONNECTIONS

(75) Inventors: Mark S. Hefty, Aloha, OR (US); Jerrie L. Coffman, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/537,396

(22) Filed: Mar. 29, 2000

(51) Int. Cl.[7] .................................. H04J 1/16

(52) U.S. Cl. .................... 370/235; 370/412; 370/429; 709/235; 709/238

(58) Field of Search .................. 370/231, 235, 370/235.1, 236, 237, 412, 413, 414, 415, 428, 429; 709/203, 224, 228, 232, 234, 235, 238

(56) References Cited

U.S. PATENT DOCUMENTS 6,078,565 A * 6/2000 Ben-Michael et al. ...... 370/236
6,426,943 B1 * 7/2002 Spinney et al. ............ 370/235

* cited by examiner

*Primary Examiner*—Dang Ton
*Assistant Examiner*—Inder Pal Mehra
(74) *Attorney, Agent, or Firm*—Christopher K. Gagne

(57) ABSTRACT

Methods and systems for flow control over channel-based switched fabric connections between a first side and a second side. At least one posted receive buffer is stored in a receive buffer queue at the first side. A number of credits is incremented based on the at least one posted receive buffer. The second side is notified of the number of credits. A number of send credits is incremented at the second side based on the number of credits. A message is sent from the second side to the first side if the number of send credits is larger than or equal to two or the number of send credits is equal to one and a second number of credits is larger than or equal to one. The second number of credits is based on at least one second posted receive buffer at the second side. Therefore, communication of messages between the first side and the second side is prevented from deadlocking.

30 Claims, 9 Drawing Sheets

METHOD AND SYSTEMS FOR FLOW CONTROL OF TRANSMISSIONS OVER CHANNEL-BASED SWITCHED FABRIC CONNECTIONS

BACKGROUND

1. Field

This invention relates to connections over channel-based switched fabrics, and more specifically to flow control of transmissions over channel-based switched fabrics.

2. Background

Computer systems may have various types of architectures. In bus based systems host units, (e.g., processors) communicate across a bus to other units such as I/O controllers, other processors, etc. However, due to physical and electrical load limitations, only a small number of I/O controllers may be attached to a bus at any one time, and may need to be physically located within the same proximity as a processor. A switched fabric system offers advantages to a bus based computer system in that many processors and I/O controllers may be directly connected to the fabric which provides channels for communication between the various devices that are interconnected across the switched fabric. A switched fabric connection allows the various devices to perform remote direct memory access (RDMA) transfers between the various devices connected to the switched fabric.

There are different types of connections that may be established across a channel-based switched fabric. These include reliable connections and unreliable connections. There currently exists for LAN (Local Area Network) devices, TCP/IP protocols for reliable delivery which may include flow control across the networks. However, these protocols generally have been designed around a switched fabric that is unreliable. For example, the fabric can be very lossy, or may have several collisions between data across the fabric. This results in the various devices having to do several retries to successfully transfer information across the fabric. A channel-based switched fabric may provide reliable communications across the fabric in which case there may be a guarantee that the message transferred will successfully arrive at the other end. However, there must be some guarantee that there is also a receive buffer available and ready at the receive end to receive the message being transmitted to it. If a message is sent across the channel-based switched fabric to a target whereby there is no receive buffer waiting at the target to receive the message, an error message may be generated by the target.

BRIEF DESCRIPTION OF THE DRAWINGS

The present invention is further described in the detailed description which follows in reference to the noted plurality of drawings by way of non-limiting examples of preferred embodiments of the present invention in which like reference numerals represent similar parts throughout the several views of the drawings and wherein.

DETAILED DESCRIPTION

Figure 1:
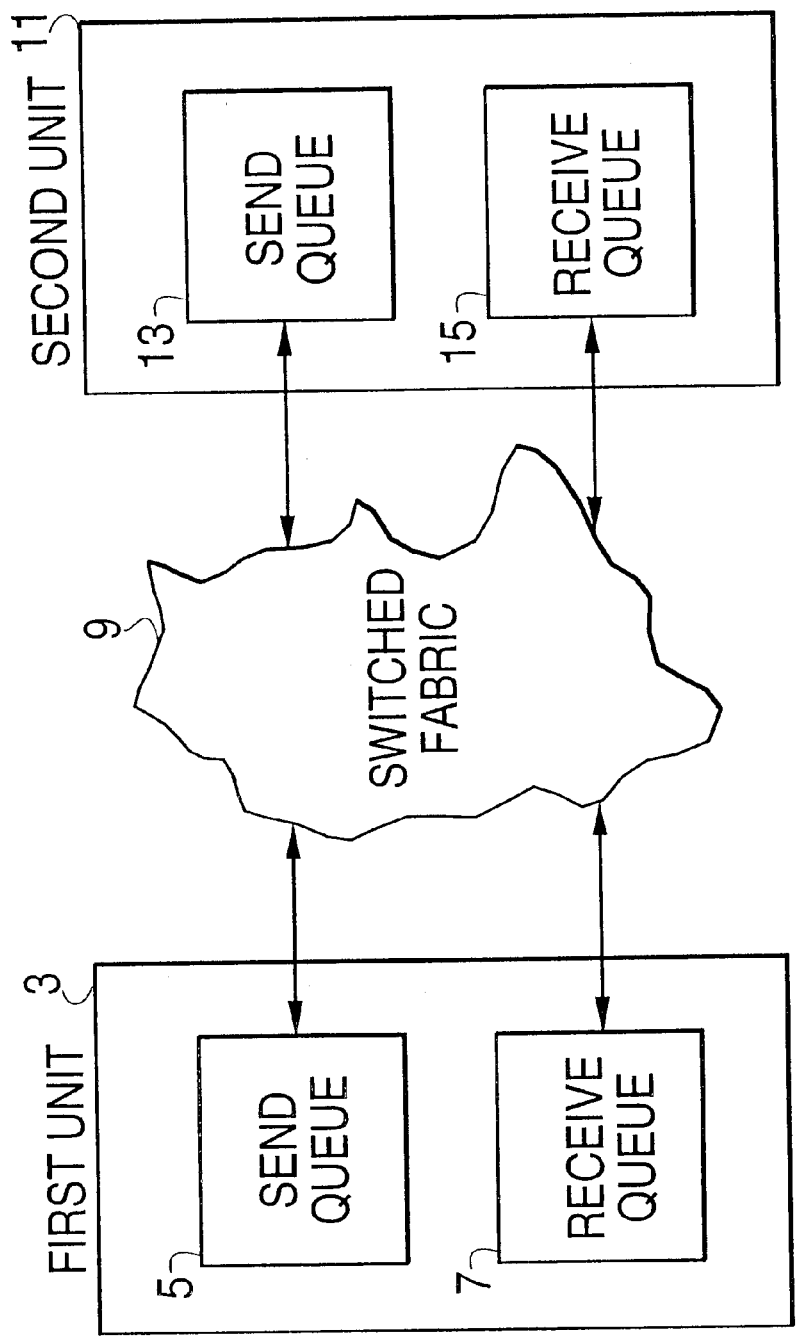
FIG. 1 shows a block diagram of an example embodiment of a first unit that may transmit information to a second unit across a switched fabric according to an example embodiment of the present invention.

The particulars shown herein are by way of example and for purposes of illustrative discussion of the embodiments of the present invention. The description taken with the drawings make it apparent to those skilled in the art how the present invention may be embodied in practice.

Further, arrangements may be shown in block diagram form in order to avoid obscuring the invention, and also in view of the fact that specifics with respect to implementation of such block diagram arrangements is highly dependent upon the platform within which the present invention is to be implemented, i.e., specifics should be well within purview of one skilled in the art. Where specific details (e.g., circuits, flowcharts) are set forth in order to describe example embodiments of the invention, it should be apparent to one skilled in the art that the invention can be practiced without these specific details. Finally, it should be apparent that any combination of hard-wired circuitry and software instructions can be used to implement embodiments of the present invention, i.e., the present invention is not limited to any specific combination of hardware circuitry and software instructions.

Although example embodiments of the present invention may be described using an example system block diagram in an example host unit environment, practice of the invention is not limited thereto, i.e., the invention may be able to be practiced with other types of systems, and in other types of environments (e.g., servers).

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment. According to an embodiment, the channel-based switched fabrics described herein may be based on the Virtual Interface (VI) Architecture Specification, Version 1.0, Dec. 16, 1997.

The present invention is directed to a method for flow control over channel-based switched fabric transmissions of messages and/or data between a first side and a second side that includes: storing at least one posted receive buffer in a receive buffer queue at a first side of a channel-based switched fabric connection; incrementing a number of credits based on the at least one posted receive buffer; notifying a second side of a channel-based switched fabric connection of the number of credits; incrementing a number of send credits at the second side based on the number of credits; and sending a message from the second side to the first side if the number of send credits is larger than or equal to two, or the number of send credits is equal to one and a second number of credits is larger than or equal to one. The second number of credits is based on at least one second posted receive buffer at the second side. Communication of messages between the first side and the second side is prevented from deadlocking.

The notifying may include sending the number of credits as part of a second message from the first side to the second side. The second message may be a normal message and the number of credits contained in an immediate data portion of the normal message. The second message may be a zero byte message that transfers the number of credits from the first side to the second side. The message may be sent from a queue of stored messages on the second side. The number of credits may be set to zero after the notifying. A number of remote credits at the first side may be incremented after the notifying where the number of remote credits may be equal to the number of send credits at the second side. A zero byte message may be sent that transfers the number of credits from the first side to the second side when the number of remote credits falls below a threshold value. The threshold value may be changeable.

The at least one posted receive buffer may be posted by an application, a device driver or a processor at the first side before the storing. All other applications, device drivers, and/or processors may be locked out at the first side from accessing the receive buffer queue after the posting and before the storing. The message may be stored in a message queue before the sending. The message may originate from an application, a device driver, or a processor at the second side before the sending. The message may be stored in a message queue at the second side after the originating and before the sending. All other applications, device drivers, and/or processors may be locked out at the second side from accessing the message queue after the originating and before the storing. The message may be sent in the order that it was stored in the message queue.

The present invention further includes a system for flow control over channel-based switched fabric connections that includes: a first unit where the first unit stores at least one posted receive buffer; a first counting device where the first counting device increments a number of credits at the first unit based on the at least one posted receive buffer; a second unit where the second unit is connectable to the first unit over a channel-based switched fabric; a second counting device where the second counting device increments a number of send credits at the second unit based on the number of credits; and control logic where the control logic determines if the number of send credits is larger than or equal two, or the number of send credits is equal to one and a second number of credits is larger than or equal to one. The second number of credits is based on at least one second posted receive buffer at the second unit. The second unit may be allowed to send a message to the first unit based on the control logic determining.

The first unit may store the at least one posted receive buffer in a receive buffer queue. A send buffer queue may store messages to be sent from the second unit to the first unit. The send buffer queue may be a first in-first out (FIFO) storage device. A processor may initiate the message at the second unit. A processor may post the at least one posted receive buffer at the first unit. The device driver may initiate the message at the second unit. A device driver may post the at least one posted receive buffer at the first unit.

The present invention may be directed to a flow control program, in a tangible medium, when executed that causes a processor-based system to perform: storing at least one posted receive buffer in a receive buffer queue at a first side of a channel-based switched fabric connection; incrementing a number of credits based on the at least one posted receive buffer; notifying a second side of a channel-based switched fabric connection of the number of credits; incrementing a number of send credits at the second side based on the number of credits; and sending a message from the second side to the first side if the number of send credits is larger than or equal to two, or the number of send credits is equal to one and a second number of credits is larger than or equal to one where the second number of credits is based on at least one second posted receive buffer at the second side. Communication of messages between the first side and the second side is prevented from deadlocking.

The notifying may include sending the number of credits as part of a second message from the first side to the second side. The number of credits may be set to zero after the notifying. A number of remote credits may be incremented at the first side after the notifying where the number of remote credits may be equal to the number of send credits at the second side. The at least one posted receive buffer may be posted by an application, a device driver, or a processor at the first side before the storing. All other applications, device drivers, and/or a processors may be locked out at the first side from accessing the receive buffer queue after the posting and before the storing.

In methods and systems for flow control of transmissions over a channel-based switched fabric according to the present invention, messages are not sent unless a receiver has memory allocated and posted to accept the incoming message. This avoids overrunning a receiver of the messages. The present invention relates to a credit based flow control system that prevents sending messages unless a buffer is known to be ready at the remote side of the channel-based switched fabric connection to receive the incoming message.

FIG. 1 shows a block diagram of an example embodiment of a system containing a first unit that may transmit information, e.g., data and/or messages, to a second unit across a switched fabric. The first unit 3 may have a send queue 5 for storing information that is to be sent from the first unit 3 to the second unit 11. The first unit 3 may also have a receive queue 7 for storing information received from the second unit 11. Information may be transmitted between first unit 3 and second unit 11 across a switched fabric 9. Similarly, second unit 11 may have a send queue 13 for storing information to be sent to first unit 3, and a receive queue 15 for storing information received from first unit 3. The first unit 3 and/or second unit 11 may be a host unit, I/O unit, computer, server, or other computing node, etc. typically including a processor, memory, and/or software, etc.

Figure 2:
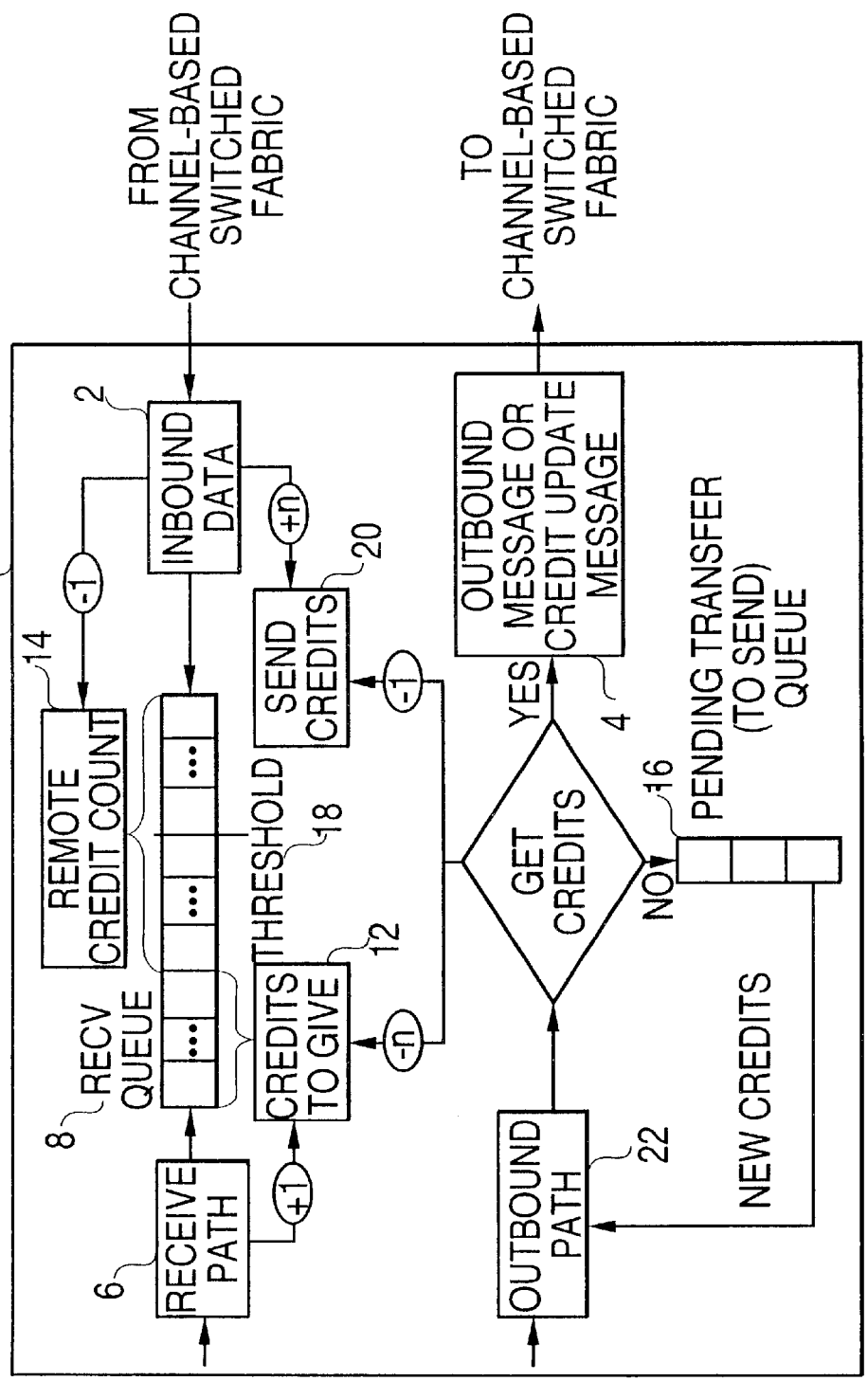
FIG. 2 is a diagram of an example embodiment of a message level flow control architecture according to an example embodiment of the present invention.

FIG. 2 shows a message level flow control architecture according to an example embodiment of the present invention that may be implemented at each side of a connection between two units or devices across a channel-based switched fabric. In FIG. 1, only one unit that is communicating to another unit across a channel-based switch fiber is shown. Although only one side of a connection is shown, both sides have the same flow control architecture. The one side of the connection 10 (as shown by the enclosed box) may consist of any entity that transfers or receives information across a switched fabric, e.g., a device driver, a processing unit, an I/O unit, and/or an application. The architecture shown in FIG. 2 may be implemented by hardware or software or a combination of each and still be within the spirit and scope of the present invention.

Inbound messages to unit 10 from a remote unit are received at unit 10 in a buffer 2. Messages that unit 10 desires to send across the channel-based switched fabric to a remote unit may be sent through buffer 4. Before a message may be sent by unit 10, there must be an available send credit for unit 10. A send credit assures that there is a buffer available at the receiving side (remote side) for receipt of a sent message. Send credits may be received in messages from a remote side of a channel-based switched fabric connection and added to an existing count by counter function 20. Messages to be sent by unit 10 may be placed by an application, device driver, processor etc. in a buffer 22.

To receive a message there must be a receive buffer available. A buffer 6 is made available, or posted, by an application, device driver, processor, or other entity that desires to initiate transferring or receiving of a message. When a buffer 6 is posted to receive an inbound message, buffer 6 may be placed on an inbound message queue 8. Each buffer 6 that is posted and placed in inbound message queue 8 represents one credit to give to a sending remote side. When a receive buffer is posted, the number of credits to give is incremented by credits to give counter function 12. Credits to give counter function 12 may include storage that stores a number that represents the total of available receive buffers (credits) that may be made available (sent) to a remote side.

Credits to give may be given to a remote side of a connection via an immediate data portion of a normal message send operation, or through the use of a zero byte message (e.g., credit update message). A zero byte message may include only header information and no data portion, and may be used only to transfer credits to a remote side. When a remote side is notified of additional credits through either process, a remote credit count 14 (credits known to be available on the remote side of a channel-based switched fabric connection) may be incremented at unit 10 by the number of credits to give (i.e., credits given to the remote side). The number of credits to give may then be reset to zero.

In methods and systems for flow control of transmissions over a channel-based switched fabric according to the present invention, when a unit has a message to send, a check may be performed for an available send credit. In order to send a message, there must be an available send credit, with the restriction that the last send credit may never be used unless there is one or more available credits to give (that may be sent to a remote side with the message). This restriction prevents deadlock between two units with connections over a channel-based switched fabric from occurring. Deadlock may occur when neither side may transmit data to the other because there are either no available send credits or receive credits, or these credits exist but they cannot be sent to the other side for use because the sending side lacks a send credit. Deadlock is avoided in the present invention by insuring that both sides of a connection do not use their last send credit without delivering one or more credits to the remote side.

Additionally, to guarantee in-order message delivery (i.e., the messages are delivered in the order that they are received), a message may only be sent if there are no messages waiting on an outbound to send queue 16. If the message may be sent (send credit available and no pending messages), the message may be posted on an outbound queue 4 to be sent across the channel-based switched fabric. Otherwise, the message may be added to the tail of to send queue 16 and stored until appropriate send credits and/or receive credits are available.

In methods and systems for flow control according to the present invention, an immediate data portion of the message may be used to provide available credits to the remote side of the connection. This reduces the overhead associated with maintaining flow control. When a message is received, a check may be made against the immediate data portion of the received message for additional send credits from the sending side. If new credits are available, the number of send credits may be incremented and a check made to send any pending messages stored in to send queue 16 to the send queue 4 for transfer across the switched fabric.

A threshold value 18 may be defined that indicates a value at which a zero byte credit update message may be triggered automatically. When a remote credit count 14 falls beneath the threshold value 18, and there are credits to give, a zero byte message may deliver the remaining credits to give to the remote site of the connection. This is assuming that a send credit is available. The threshold value 18 may be user defined and allows a continual flow of incoming messages in the absence of normal outbound messages. The threshold value 18 may be set to any value by a user, e.g., set to half of the initial remote credit count. The threshold value 18 may also be set to zero.

Figure 3:
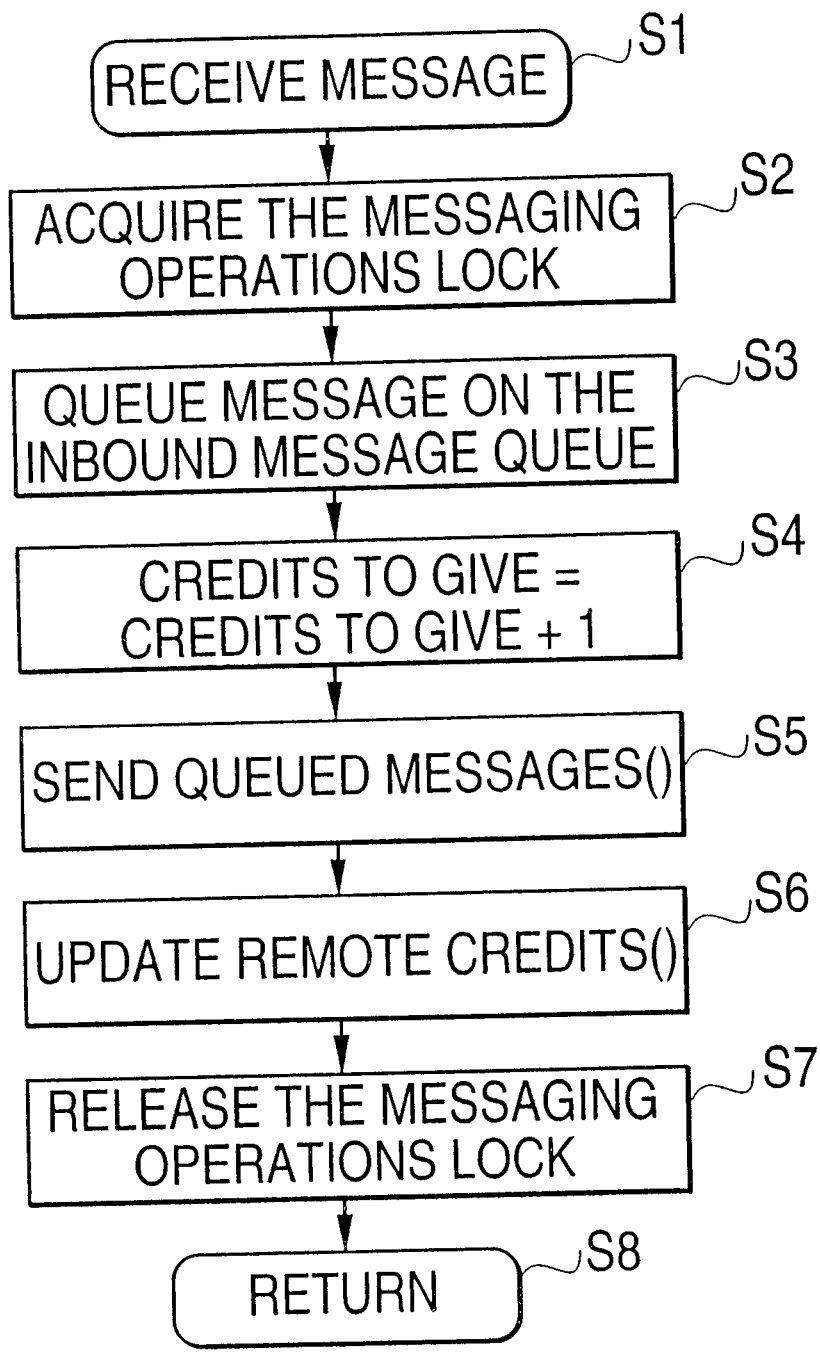
FIG. 3 is a flow chart of an example ReceiveMessage process according to an example embodiment of the present invention.

FIG. 3 shows a flow chart of an example "ReceiveMessage" process according to the present invention. This process relates to an application or device driver posting a receive message buffer. This process entitled "ReceiveMessage" S1, may be called by other processes that relate to a flow control mechanism according to the present invention. When operations are being performed on the queues or buffers (e.g., posting a receive buffer, updating credits to give, remote credits, or send credits, etc.), other applications or processors that desire to manipulate, add to, or take away from the buffers, may be locked out to prevent conflicting situations. Therefore, in the ReceiveMessage process in FIG. 3, initially a messaging-operation lock is acquired S2, which locks the queues and allows only a single entity control over the queues. Then the application may post a new receive message buffer which then may be placed on the inbound message queue S3. The number of credits to give may be tallied by either a counter, adder, software routine or other mechanism, whereby when an inbound message queue is received, the credits to give is incremented by one S4.

There is now an available credit to give (to a remote side). Therefore, if there is a send credit available, then it may be used to send a message currently waiting on the to send queue. Therefore, another process "SendQueueMessages" is invoked S5 that sends queued messages. The SendQueueMessages process will be discussed in further detail following. Since there is now an available receive buffer, a check now may be made to see if a zero byte credit update message needs to be sent (i.e., because there is no message to be sent that may be also used to transfer the credits to give). Thus, another process, "UpdateRemoteCredits" S6, may be invoked. When the UpdateRemoteCredits is completed, the messaging operation lock may be released S7, and the Receive Message process will end or return to where it may have been invoked S8. The following is example psuedocode for the example ReceiveMessage process:

```
ReceiveMessage ( Message )
{
    Acquire the messaging operations lock
    Queue Message on the inbound message queue
    Increment CreditsToGive
    // There is now an available credit to give. This means that if there
    // is a send credit available, then it may be used to send a message
    // currently waiting on the ToSendQueue.
    SendQueuedMessages()
    // Check to send a 0-byte, credit update message
    UpdateRemoteCredits()
    Release the messaging operations lock
}
```

Figure 4:
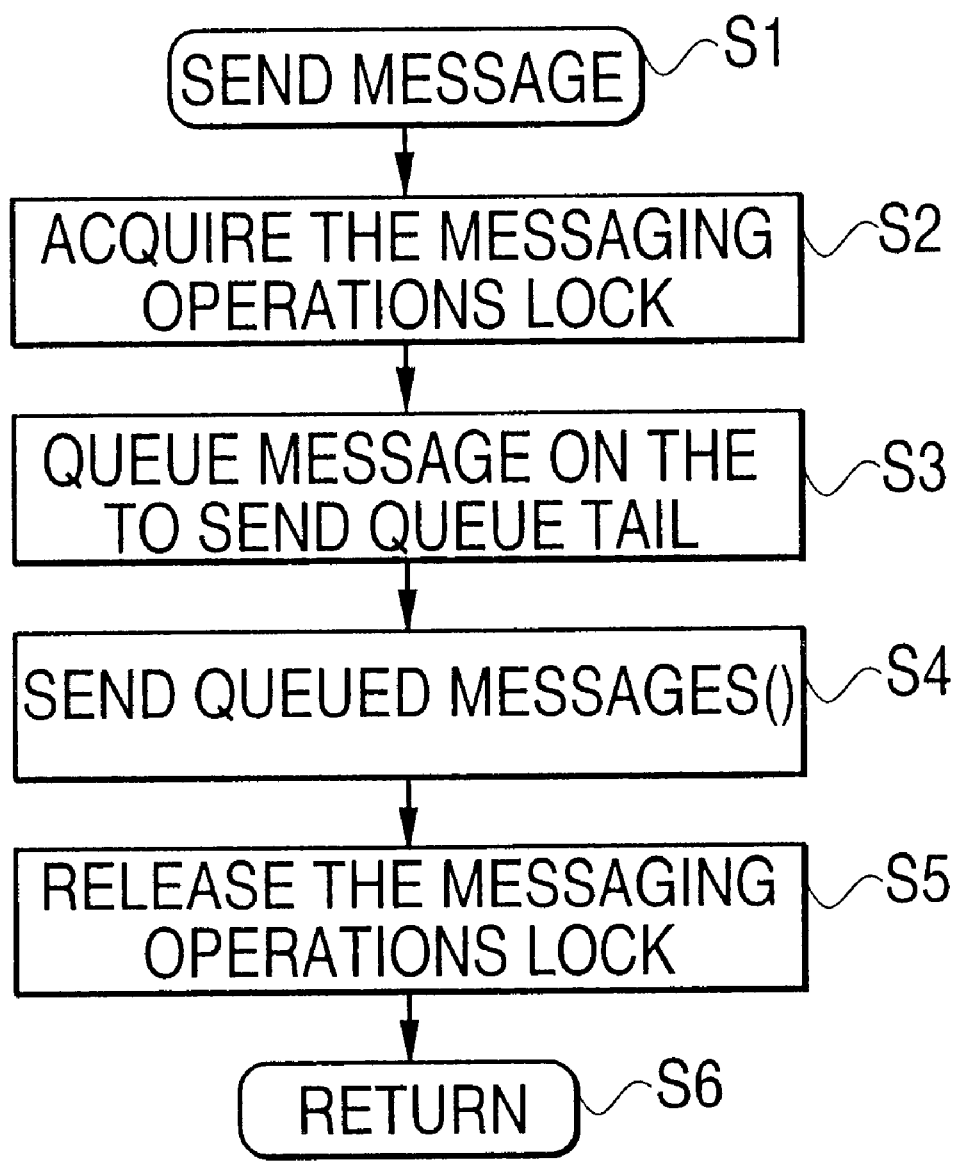
FIG. 4 is a flow chart of an example SendMessage process according to an example embodiment of the present invention.

FIG. 4 shows a flow chart of an example "SendMessage" process according to the present invention. This process relates to an application or device driver preparing a message that is to be sent across a channel-based switched fabric to another remote site. The SendMessage process S1 may be called by other processes. Initially, a messaging operations lock may be acquired S2 which locks out other entities from accessing the queues or buffers. The message to be sent is entered into the to send queue to get in line with other messages that have been queued up that are ready to send S3. A SendQueuedMessages process may be invoked S4 which determines if there are messages in the to send queue that may be sent. Once the SendQueuedMessages process has been completed the messaging operation lock may be released S5. The SendMessage process then completes and/or returns to the other process that invoked it S6. The following is example psuedocode for the example SendMessage process:

```
SendMessage ( Message )
{
    Acquire the messaging operations lock
    Queue Message on the ToSendQueue tail
    SendQueuedMessages()
    Release the messaging operations lock
}
```

Figure 5:
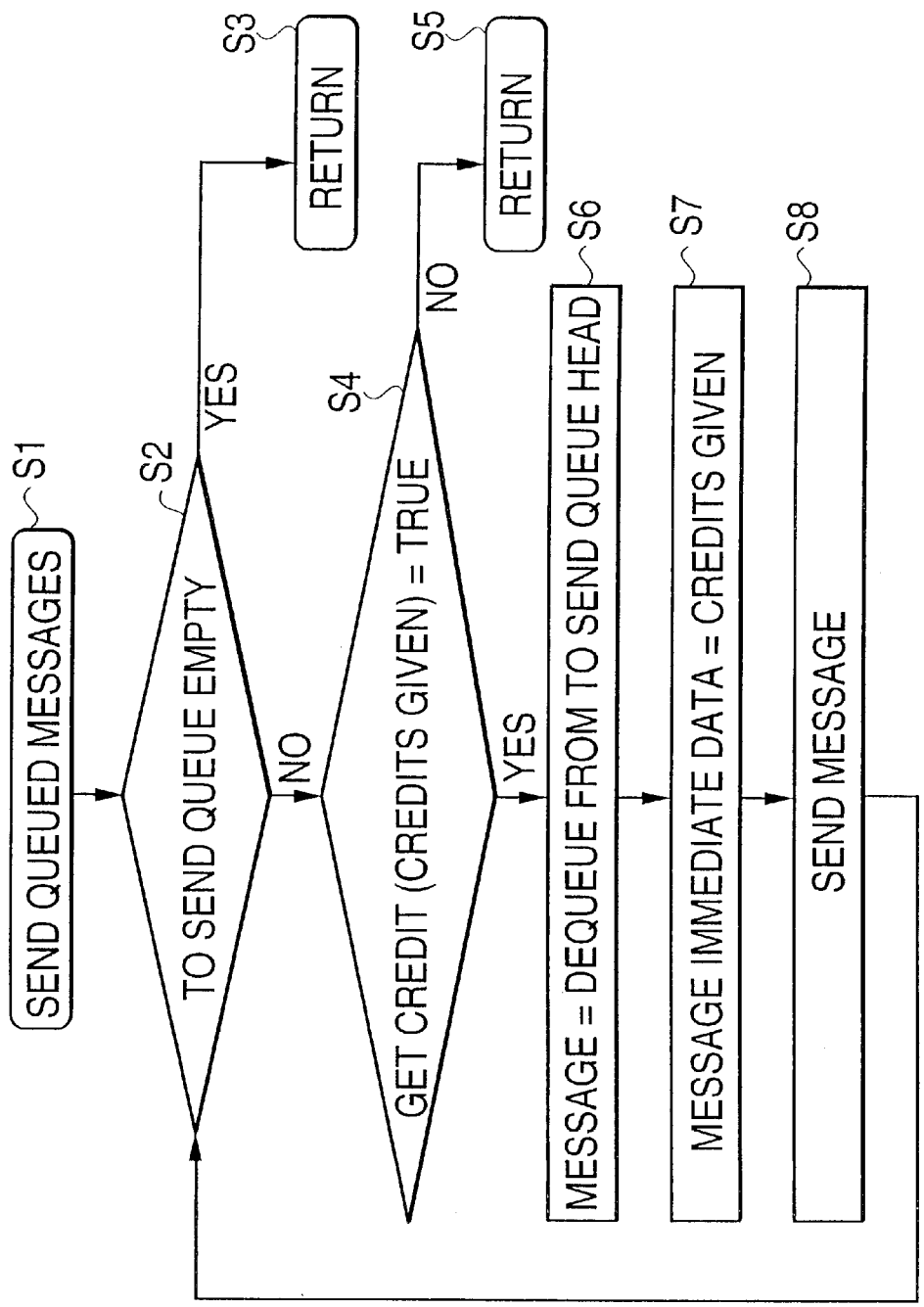
FIG. 5 is a flow chart of an example SendQueuedMessages process according to an example embodiment of the present invention.

FIG. 5 shows a flow chart of an example "SendQueuedMessages" process S1 according to the present invention. This process relates to sending messages that are queued up in the to send queue. Messages may be waiting in the to send queue that need to be sent. This process will send as many messages as possible and will automatically update the number of send credits on the remote side. A check may be first made to determine if the to send queue is empty S2, and if so, the SendQueuedMessages process ends S3. If the to send queue is not empty, then a determination may be made to see whether there are send credits available. Thus, a "GetCredit" process may be invoked S4 to determine if a send credit is available for sending a message out. The GetCredit process may returns a "true" value if a send credit is available. If a "true" value is not returned from the GetCredit process, the SendQueuedMessages process may terminate S5. If the GetCredit process does return "true", which suggests that a send credit is available for sending a message out, the first message that was placed in the to send queue is dequeued (retrieved) and prepared to be sent S6. The message may contain an immediate data field wherein may be placed a number representing the credits to give (CreditsGiven) S7 to the remote side. The message may then be sent across the channel-based switched fabric S8. Another check may be made to determine if the to send queue is empty, or if there are still other message to be sent S2. Activities S2 through S8 of the SendQueuedMessages process repeat until the to send queue is empty or until no send credit is available for sending a message out. The following is example psuedocode for the example SendQueuedMessages process:

```
SendQueuedMessages ( Message )
{
    // Messages may be waiting on the ToSendQueue. Send as many
    // messages as possible. This will automatically update
    // the number of send credits on the remote side.
    while the ToSendQueue is not Empty
    {
        // Stop sending messages if we cannot get a send credit.
        if GetCredit( CreditsGiven ) = FALSE
            break
        // Get a message to send from the head of the ToSendQueue.
        Message = Dequeue from ToSendQueue head
        // Update the remote credit count and send the message
        Set Message Immediate Data = CreditsGiven
        Send Message
    }
}
```

Figure 6:
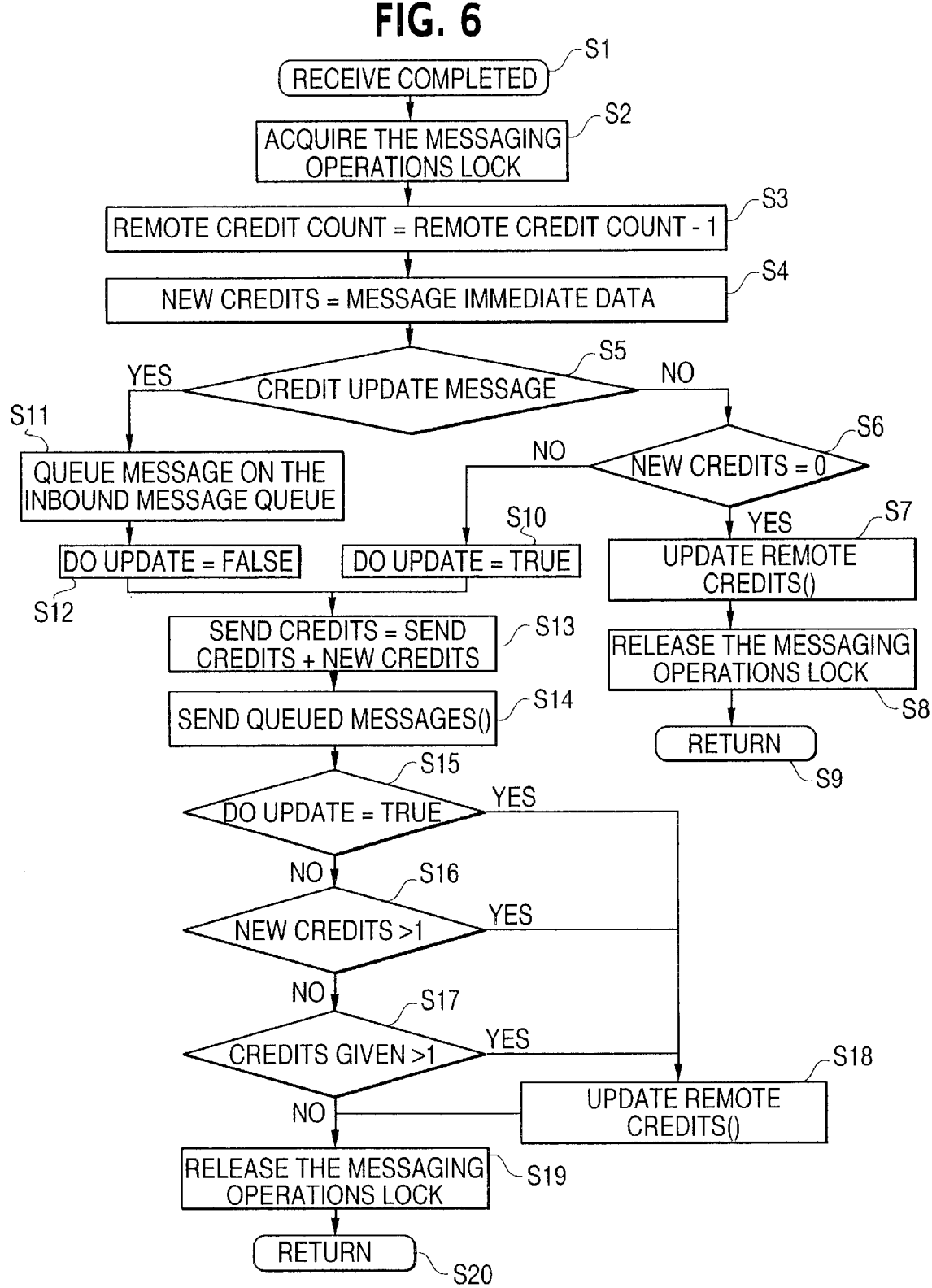
FIG. 6 is a flow chart of an example ReceivedCompleted process according to an example embodiment of the present invention.

FIG. 6 shows a flow chart of an example "ReceivedCompleted" process S1 according to the present invention. This process relates to receiving a message from a remote side. Initially a messaging operation lock may be acquired S2. Since the message now has been received and a receive buffer used to receive the message, a remote credit count may be decremented by one S3, because the remote side has used up one of its send credits to send the current message. An immediate data portion of the received message may be then checked to determine if new credits have been given S4 to the current side by the remote side in the message. A determination may be made to identify if the message received is a credit update message (i.e., zero byte message) S5. If the received message is not a credit update message, a determination may be made to identify if new credits were received with (i.e., sent in) the normal message S6. If new credits were not received, then an "UpdateRemoteCredits" process may be invoked S7. Once the UpdateRemoteCredits process completes, the messaging operation lock may be released S8, and the ReceiveCompleted process terminates S9.

If new credits were received S6 then a "DoUpdate" parameter may be set equal to "true" S10. If a credit update message has been received S5, the inbound message may be queued (placed) onto the inbound message queue S11, and the DoUpdate parameter may be set equal to "false" S12. If new credits have been received, the number of send credits may be updated and an attempt is made to send any messages that might be waiting in the to send queue. The message operations may be serialized to prevent new sends from passing queued ones. Thus, in FIG. 6, the send credits may be incremented with the new credits S13. The SendQueuedMessages process (discussed previously) may then be invoked S14. Once the SendQueuedMessages process has completed, a series of checks may be made. If the DoUpdate parameter is equal to "true" S15, or the new credits number is larger than one S16, or the number credits given is larger than one S17 then an UpdateRemoteCredits process may be invoked S18. This avoids continually sending update credit messages back and forth since the remote credits may be updated if more than one credit from the remote side is received or the current side has more one than credit to give. Once the UpdateRemoteCredits process has completed, the messaging operation lock is released S19. The ReceiveCompleted process then terminates S20. The following is example psuedocode for the example ReceiveCompleted process:

```
ReceiveCompleted ( Message )
{
    Acquire the messaging operations lock
    Decrement RemoteCreditCount
    NewCredits = Message Immediate Data
    if Message is a 0-byte, credit update message then
    {
        Queue Message on the inbound message queue
        DoUpdate = FALSE
    }
    else
    {
        // If we don't have any new credits, we can't send anything that
        // might be waiting to go out.
        if NewCredits = 0 then
        {
            // Check to send a 0-byte, credit update message.
            UpdateRemoteCredits()
            Release the messaging operations lock
            return
        }
        DoUpdate = TRUE
    }
    // Update the number of send credits then try to send any
    // messages that might be waiting in the ToSendQueue. Note that we
    // serialize message operations to prevent new sends from passing
    // queued ones.
    SendCredits = SendCredits + NewCredits
    SendQueuedMessages()
    // To avoid continually sending 0-byte, update credit messages back
    // and forth, we only update the remote credits if we received more
    // than one credit from the remote side or we have more than
    // 1 credit to give.
    if(DoUpdate or NewCredits > 1 or CreditsGiven > 1)
    {
        UpdateRemoteCredits()
    }
    Release the messaging operations lock
}
```

Figure 7:
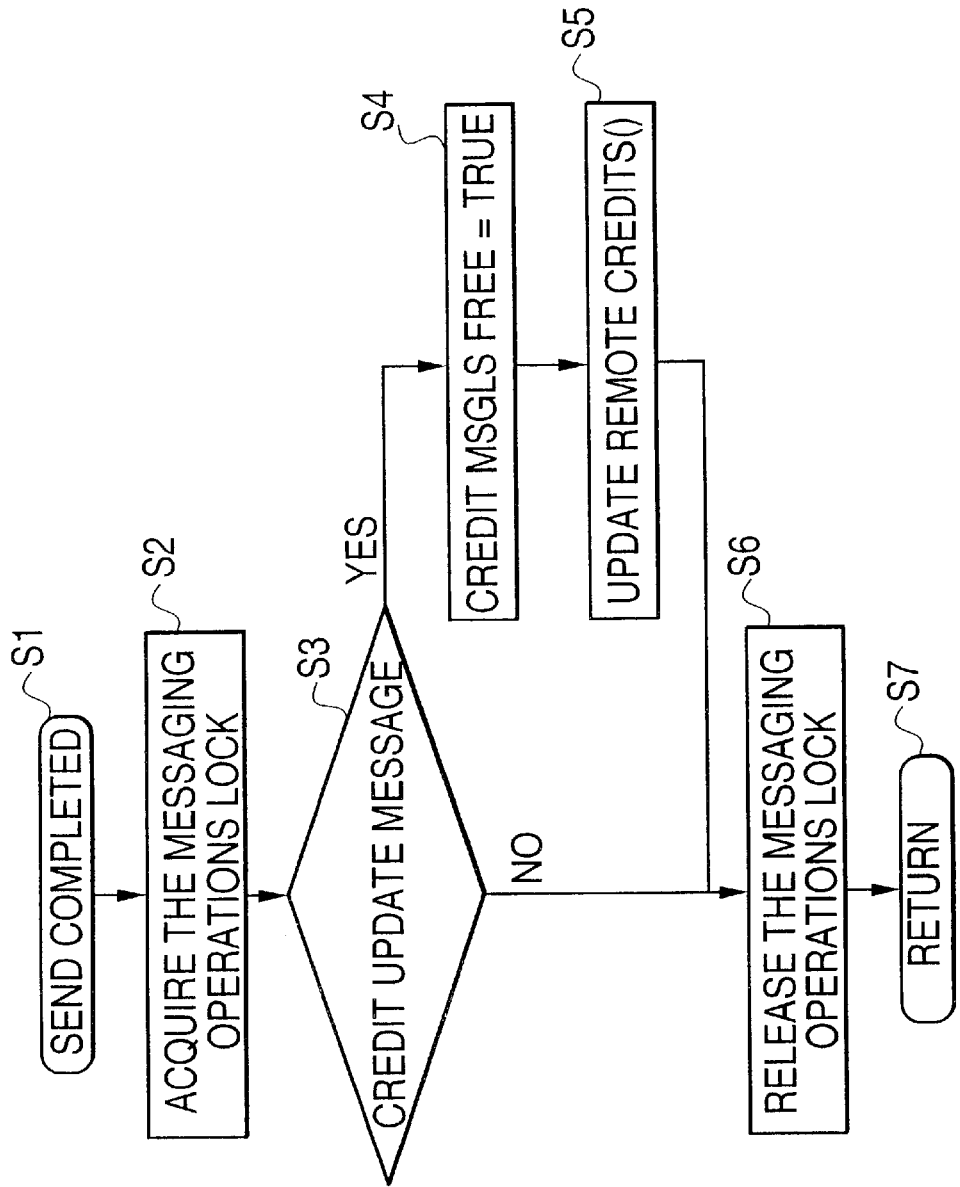
FIG. 7 is a flow chart of an example SendCompleted process according to an example embodiment of the present invention.

FIG. 7 shows a flow chart of an example "SendCompleted" process S1 according to the present invention. This process relates to completion of a message that has been sent to a remote side. Initially a messaging operation lock may be acquired S2. It may be determined if the message sent was a credit update message S3. If not, the messaging operation lock may be released S6, and the SendCompleted process terminated S7. However, if the message sent was a credit update message, then a creditmsgisfree parameter is set equal to "true" S4. This frees up the credit update message for further use if needed. The UpdateRemoteCredits process may then be invoked S5, and then the SendCompleted process terminates S7. The following is example psuedocode for the example SendCompleted process:

```
SendCompleted ( Message )
{
    Acquire the messaging operations lock
    if send completion is for 0-byte, credit update message
    {
        // Indicate that the credit message is available to use again.
        CreditMsgIsFree = TRUE
        // A 0-byte, credit update may have been blocked while the
        // credit update message was in use. Check to send a 0-byte,
        // credit update message now.
        UpdateRemoteCredits()
    }
    Release the messaging operations lock
}
```

Figure 8:
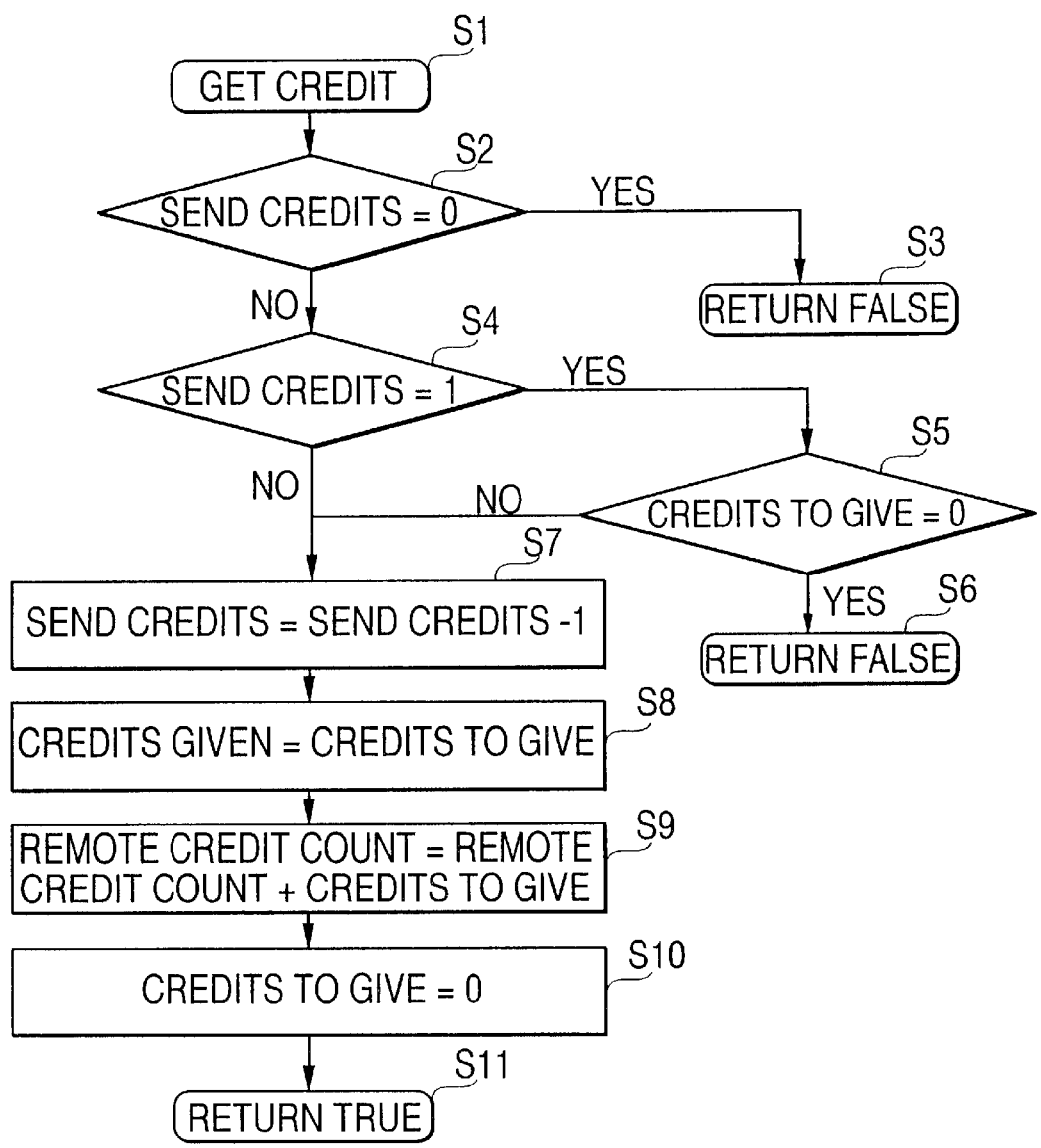
FIG. 8 is a flow chart of an example GetCredit process according to an example embodiment of the present invention.

FIG. 8 shows a flow chart of an example "GetCredit" process S1 according to the present invention. This process relates to determining whether enough send credits are available so a message may be sent out. Initially a determination is made whether any send credits are available S2, and if not the GetCredit process terminates S3 and returns a value of "false". If there are send credits available, then a determination is made as to whether there is just one send credit S4. If there is only one send credit available a determination is made to see if there are any credits to give S5. If there are no credits to give then the get credit routine returns "false" and terminates S6. This insures that there is no deadlock due to a unit using its last send credit without also giving a credit to the remote side.

If the number of send credits is larger than one, or equal to one and the number of credits to give is larger than zero, then the number of send credits is decremented by one S7. Credits given is then set equal to the number of credits to give S8. The remote credit count is then increased by the number of credits to give S9. Since now all available credits to give are about to be sent to the remote side, the credits to give is set equal to zero S10. The GetCredit process then returns a value of "true" and terminates S11. This allows a waiting message to then be transferred. The following is example psuedocode for the example GetCredit process:

```
GetCredit ( CreditsGiven )
{
    // Verify that credits are available.
    if ( SendCredits = 0 or ( SendCredits = 1 and CreditsToGive = 0))
        return FALSE
    // Retrieve an available send credit and return all credits to give.
    Decrement SendCredits
    CreditsGiven = CreditsToGive
    RemoteCreditCount = RemoteCreditCount + CreditsToGive
    CreditsToGive = 0
    return TRUE
}
```

Figure 9:
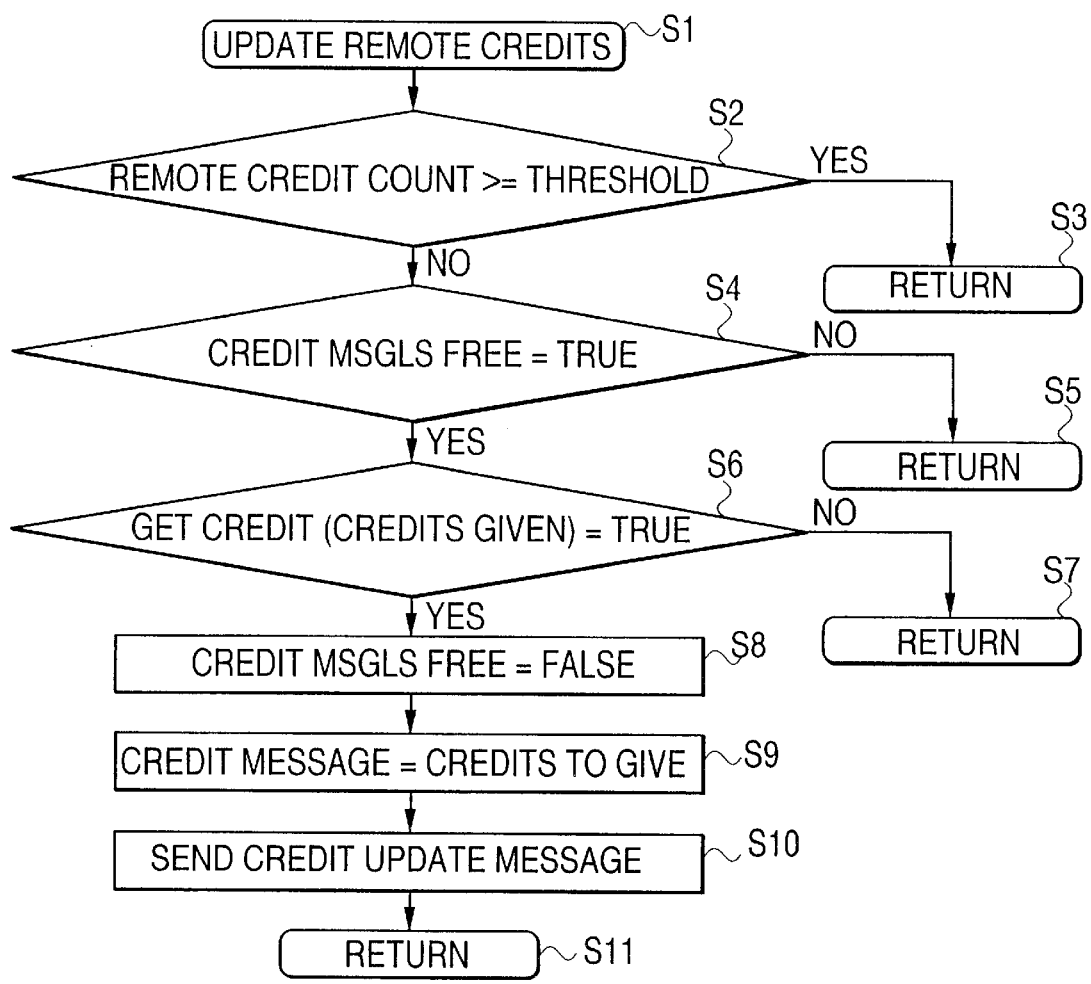
FIG. 9 is a flow chart of an example UpdateRemoteCredits process according to an example embodiment of the present invention.

FIG. 9 shows a flow chart of an example "UpdateRemoteCredits" process S1 according to the present invention. This relates to the remote credit count 14 shown in FIG. 2. A determination may be made to see whether the remote credit count is larger than or equal to a preset threshold value S2. If the number of remote credits is larger than or equal to the threshold value, then the UpdateRemoteCredits process terminates S3. However, if the number of remote credits count is less than the threshold value, a determination is made whereby the creditmsgisfree parameter is checked to see if it is equal to "true" S4. If the creditmsgisfree parameter is not set equal to "true", the UpdateRemoteCredits process terminates S5. If the creditmsgisfree parameter is equal to "true", which suggests that the credit update message is not in use and that there are available credits to give to the remote side, then a determination is made to identify whether the GetCredit process has returned a value of "true" S6, and if not, the UpdateRemoteCredits process terminates S7. If the GetCredit routine returns a value of "true", then the creditmsgisfree parameter is set equal to "false" S8. The immediate data of the credit update message is set equal to the credits to give S9. The credit update message is then sent S10, and the UpdateRemoteCredits process terminates S11. The following is example psuedocode for the example UpdateRemoteCredits process:

```
UpdateRemoteCredits ()
{
    // See if we've reached the Threshold yet.
    if ( RemoteCreditCount >= Threshold)
```

-continued

```
{
    // Threshold has not been reached yet
    return
}
// Make sure that the credit message is not in use and that there
// are available credits to give the remote side.
if ( CreditMsgIsFree and GetCredit( CreditsGiven ))
{
    // Send the credit update as a 0-byte message.
    CreditMsgIsFree = FALSE
    // Update the remote credit count and send the message
    Set CreditMessage Immediate Data = CreditsToGive
    Send CreditMessage
}
}
```

A flow control according to the present invention may be implemented in hardware, firmware, software or a combination of these and still be within the spirit and scope of the present invention. An example embodiment of the present invention may include a flow control computer software program that may be resident at all units and/or sides that are connected to a channel-based switched fabric and desire flow control according to the present invention. Each of the processes discussed previously (e.g., ReceiveMessage, SendMessage, SendQueuedMessages, ReceiveCompleted, SendCompleted, GetCredit, UpdateRemoteCredits), or other processes, may be implemented as functions or subroutines of a flow control computer software program. Further, the computer software program implementing a flow controller according to the present invention may be an object-oriented program where one or all of the processes mentioned may be objects in the object-oriented computer program. The flow control computer software program may be executed by a controller, processor, I/O unit or other device or apparatus connected to a channel-based switched fabric. The example processes implemented as functions, subroutines, objects, etc. may invoke each other and pass data and/or parameters between each other as needed. An advantage to a software implementation of a flow controller according to the present invention is that implementation as a software package that may be stored on desired units or other entities that transfer information across a channel-based switched fabric, or removed from them (e.g., uninstalled) makes the flow controller portable and adaptable.

It is noted that the foregoing examples have been provided merely for the purpose of explanation and are in no way to be construed as limiting of the present invention. While the present invention has been described with reference to a preferred embodiment, it is understood that the words which have been used herein are words of description and illustration, rather than words of limitation. Changes may be made within the purview of the appended claims, as presently stated and as amended, without departing from the scope and spirit of the present invention in its aspects. Although the present invention has been described herein with reference to particular methods, materials, and embodiments, the present invention is not intended to be limited to the particulars disclosed herein, rather, the present invention extends to all functionally equivalent structures, methods and uses, such as are within the scope of the appended claims.

What is claimed is:

1. A method for flow control over channel-based switched fabric connections comprising:

storing at least one posted receive buffer in a receive buffer queue at a first side of a channel-based switched fabric connection;

incrementing a number of credits based on the at least one posted receive buffer;

notifying a second side of a channel-based switched fabric connection of the number of credits;

incrementing a number of send credits at the second side based on the number of credits; and sending a message from the second side to the first side if at least one of the number of send credits is larger than or equal to two, and the number of send credits is equal to one and a second number of credits is larger than or equal to one, the second number of credits being based on at least one second posted receive buffer at the second side.

2. The method according to claim 1, wherein the notifying comprises sending the number of credits as part of a second message from the first side to the second side.

3. The method according to claim 2, wherein the second message is a normal message and the number of credits comprises an immediate data portion of the normal message.

4. The method according to claim 2, wherein the second message is a zero byte message that transfers the number of credits from the first side to the second side.

5. The method according to claim 1, comprising sending the message from a queue of stored messages on the second side.

6. The method according to claim 1, comprising setting the number of credits to zero after the notifying.

7. The method according to claim 1, comprising incrementing a number of remote credits at the first side after the notifying, the number of remote credits being equal to the number of send credits at the second side.

8. The method according to claim 7, comprising sending a zero byte message that transfers the number of credits from the first side to the second side when the number of remote credits falls below a threshold value.

9. The method according to claim 8, wherein the threshold value is changeable.

10. The method according to claim 1, wherein the at least one posted receive buffer is posted by at least one of an application, a device driver and a processor at the first side before the storing.

11. The method according to claim 10, comprising locking out at least one of an application, a device driver, and a processor at the first side from accessing the receive buffer queue after the posting and before the storing.

12. The method according to claim 1, comprising storing the message in a message queue before the sending.

13. The method according claim 1, comprising originating the message from at least one of an application, a device driver, and a processor at the second side before the sending.

14. The method according claim 13, comprising storing the message in a message queue at the second side after the originating and before the sending.

15. The method according to claim 14, comprising locking out all other at least one of an application, a device driver, and a processor at the second side from accessing the message queue after the originating and before the storing.

16. The method according to claim 14, comprising sending the message in the order that it was stored in the message queue.

17. A system for flow control over channel-based switched fabric connections comprising:

a first unit, the first unit storing at least one posted receive buffer;

a first counting device, the first counting device incrementing a number of credits at the first unit based on the at least one posted receive buffer;

a second unit, the second unit being connectable to the first unit over a channel-based switched fabric;

a second counting device, the second counting device incrementing a number of send credits at the second unit based on the number of credits; and control logic, the control logic determining if one of the number of send credits is larger than or equal to two, and the number of send credits is equal to one and a second number of credits is larger than or equal to one, the second number of credits being based on at least one second posted receive buffer at the second unit, the second unit being allowed to send a message to the first unit based on the control logic determining.

18. The system according to claim 17, comprising a receive buffer queue, the first unit storing the at least one posted receive buffer in the receive buffer queue.

19. The system according to claim 17, comprising a send buffer queue, the send buffer storing messages to be sent from the second unit to the first unit.

20. The system according to claim 17, the send buffer queue comprising a first in-first out (FIFO) storage device.

21. The system according to claim 17, comprising a processor, the processor initiating the message at the second unit.

22. The system according to claim 17, comprising a processor, the processor posting the at least one posted receive buffer at the first unit.

23. The system according to claim 17, comprising a device driver, the device driver initiating the message at the second unit.

24. The system according to claim 17, comprising a device driver, the device driver posting the at least one posted receive buffer at the first unit.

25. A flow control program, in a tangible medium, when executed that causes a processor-based system to perform:

storing at least one posted receive buffer in a receive buffer queue at a first side of a channel-based switched fabric connection;

incrementing a number of credits based on the at least one posted receive buffer;

notifying a second side of a channel-based switched fabric connection of the number of credits;

incrementing a number of send credits at the second side based on the number of credits; and sending a message from the second side to the first side if one of the number of send credits is larger than or equal to two, and the number of send credits is equal to one and a second number of credits is larger than or equal to one, the second number of credits being based on at least one second posted receive buffer at the second side.

26. The flow control program according to claim 25, wherein the notifying comprises sending the number of credits as part of a second message from the first side to the second side.

27. The flow control program according to claim 25, comprising setting the number of credits to zero after the notifying.

28. The flow control program according to claim 25, comprising incrementing a number of remote credits at the first side after the notifying, the number of remote credits being equal to the number of send credits at the second side.

29. The flow control program according to claim 25, wherein the at least one posted receive buffer is posted by at least one of an application, a device driver and a processor at the first side before the storing.

30. The flow control program according to claim 25, comprising locking out all other at least one of an application, a device driver, and a processor at the first side from accessing the receive buffer queue after the posting and before the storing.

* * * * *